April 20, 1965 R. W. CASHMAN 3,178,789
CLAMP APPARATUS
Filed Aug. 30, 1962

INVENTOR.
Robert W. Cashman
BY
Learman, Learman & McCulloch
ATTORNEYS

United States Patent Office 3,178,789
Patented Apr. 20, 1965

3,178,789
CLAMP APPARATUS
Robert W. Cashman, Saginaw, Mich., assignor to Saginaw Machine and Tool Company, Saginaw, Mich., a corporation of Michigan
Filed Aug. 30, 1962, Ser. No. 220,472
4 Claims. (Cl. 24—252)

This invention relates to clamp apparatus and more particularly to clamping devices that are especially adapted for use as means for transmitting movement from one relatively movable member to another and avoiding any slackness or play when the direction of relative movement of such members is reversed.

There are many instances where it is desirable to interpose motion transmitting means between two relatively movable members for effecting movement of either member in response to movement of the other. The prior art contains many examples of motion transmitting devices which are capable of functioning satisfactorily if a relatively small amount of play or looseness is not objectionable. However, in precision automatic machinery of the kind adapted to produce workpieces to extremely close tolerances, the presence of any play in the motion transmitting mechanism often manifests itself in the production of workpieces which do not conform to the allowable tolerance limits. Consequently, it is not unusual for workpieces to be scrapped or, alternatively, subjected to a series of subsequent machining operations if they are to be manufactured in accordance with specifications. A very substantial reduction in unusable or unsatisfactory parts can be achieved if the looseness or play of the motion transmitting mechanism is eliminated or reduced.

An object of this invention is to provide clamping apparatus that readily lends itself to use as part of a motion transmitting mechanism and which has little or no inherent looseness or play.

Another object of the invention is to provide apparatus of the kind described which is adapted for use in conjunction with both rotary and translatory motion transmitting mechanisms.

A further object of the invention is to provide apparatus of the kind referred to which is simple in construction and economical to manufacture.

Another object of the invention is to provide apparatus such as has been described which is adjustable and provided with self-contained means for facilitating its assembly with and disassembly from other parts of the motion transmitting mechanisms of which it is a part.

A further object of the invention is to provide apparatus for transmitting motion from one relatively movable member to another and in which provision is made to prevent damage to the motion transmitting apparatus or to the relatively movable members.

Another object of the invention is to provide motion transmitting apparatus that is operable to transmit motion from one member to another or to permit relative movement between the members, according to the direction of such relative movement.

Other objects and advantages of the invention will be pointed out specifically or will become apparent from the following description when it is considered in conjunction with the appended claims and the accompanying drawings, in which:

Figure 2:
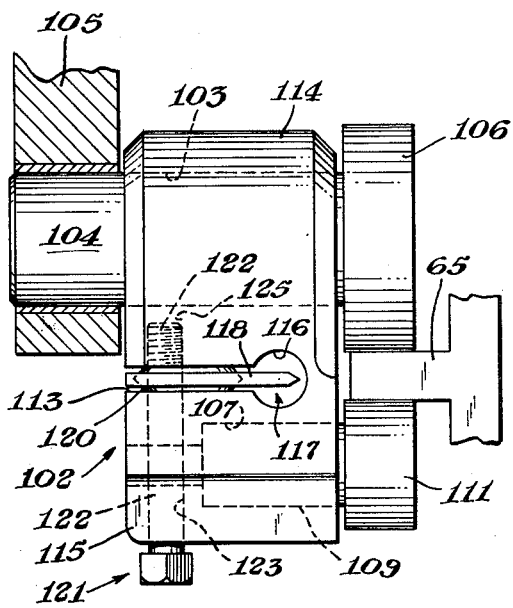
FIGURE 2 is a side elevational view, partly in section, of the apparatus shown in FIGURE 1.

Apparatus constructed in accordance with the disclosed embodiment of the invention.

The embodiment of the invention disclosed in the figures comprises a body member 102 formed of steel or the like having an opening 103 adjacent one end thereof through which extends a shaft 104 that is supported at one end in a mounting member 105. On the other end of the shaft 104 is rotatably journaled a clamp roller 106. Adjacent the opposite end of the body 102 is a pair of spaced apart bores 107 and 108 for the reception of shafts 109 and 110 on which rollers 111 and 112, respectively, are journaled. The rollers 111 and 112 are rotatable about axes lying in the same plane and spaced from the axis of rotation of the roller 106 an amount corresponding substantially to the thickness of a member 65 which is movable relatively to the member 105.

Between its ends the body member is slotted as at 113 so as partially to split the member into two parts 114 and 115. The slot 113 extends the full width of the member 102, but terminates short of the face adjacent the rollers in an enlarged bore 116 so as to provide a hinge joint about which the body parts 114 and 115 may rock.

The apparatus includes yieldable force transmitting means 117 operable to exert a force on the body parts so as to urge them to rock in such directions as to cause the rollers 106 and 111 to bear forcibly against the opposed surfaces of the member 65. The force transmitting means comprises a carrier or retainer plate 118 of less thickness than the width of the slot 113 and having a pair of openings 119 therein in which is loosely received a plurality of Belleville spring washers 120.

Normally, the spring washers 120 constantly urge the parts of the body 102 to rock in such directions as to decrease the spacing between the axes of rotation of the roller 106 and the pair of rollers 111 and 112, and thereby clamp the member 65 between the rollers. However, stabilizing means 121 is provided to overcome the force of the springs and permit the body parts to rock in the opposite direction. The means 121 comprises a bolt 122 having a threaded shank that is slideably received in a bore 123 formed in the body part 115 and which also freely extends through an opening 124 formed in the retainer plate 118. The threaded end of the bolt is received in a correspondingly threaded opening 125 that is formed in the body part 114.

Figure 1:
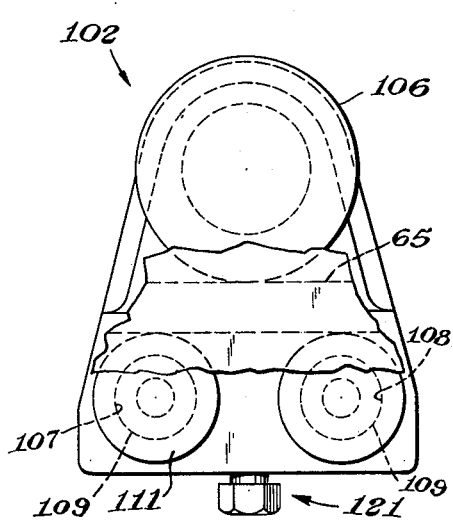
FIGURE 1 is a fragmentary, side elevational view of apparatus constructed in accordance with one embodiment of the invention.
Figure 3:
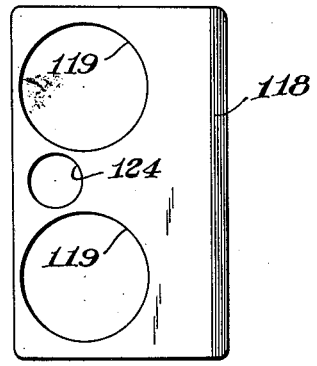
FIGURE 3 is a plan view of a part of the apparatus.

In normal operation of the apparatus, the head of the bolt 122 is spaced from the base of the body 102, as is shown in FIGURES 1 and 2, thereby permitting the force transmitting means 117 to exert its force on the body parts. When it is desired to overcome the force of the springs, however, the bolt 122 may be threaded into the body part 114 so as to cause the bolt head to bear against the body part 115 and draw the parts 114 and 115 together, thereby relieving the clamping force exerted by the rollers 106, 111, and 112 on the member 65.

The capacity of the spring means 117 should be such as to be capable of resisting normal forces tending to compress it so that there will be no tendency of the rollers 111 to move away from the roller 106 during normal operation of the apparatus, except as may be required by any cam contour formed on the part 65. Thus, although the opposed surfaces of the member 65 are forcibly engaged by the rollers 106 and 111, respectively, and although the spring means 117 is yieldable, its force is sufficient to avoid any play or looseness between the rollers and the member 65 during normal operations of the apparatus. In the event of abnormal forces being exerted on the members 65 or 105, however, the spring means 117 may yield to provide some protection against damaging the apparatus.

The disclosed embodiment is representative of a presently preferred form of the invention, but is intended to be illustrative rather than definitive thereof. The invention is defined in the claims.

I claim:

1. A clamp device for exerting clamping forces on two opposed surfaces of a member, said device comprising a body member having first and second sections hinged to one another for rocking about an axis passing through said body member; rotatable first clamp means; rotatable second clamp means; means respectively mounting said first and second clamp means on said first and second sections of said body member on opposite sides of said axis for rotation of said first and second clamp means about spaced axes parallel to each other but transverse to the first mentioned axis; and yieldable force transmitting means interposed and acting on said first and second sections for forcibly urging said first and second clamp means into engagement with the respective surfaces of said member.

2. The device set forth in claim 1 wherein said body is slotted parallel to its axis of hinging to receive said force transmitting means.

3. A clamp device for exerting clamping forces on two opposed surfaces of a member, said device comprising a body slotted between its ends to form a first part and a second part hingedly connected thereto to rock about an axis; first rotatable clamp means mounted on said first body part for rotation about a first axis; second rotatable clamp means mounted on said second body part for rotation about a second axis spaced from said first axis, the axis of rocking of said body parts being between said first and second axes; and yieldable force transmitting means acting on said body parts and urging them to rock in a direction to cause said first and second clamp means forcibly to engage the respective surfaces of said member.

4. The device set forth in claim 3 including stabilizing means interconnecting said body parts and operable to overcome the force of said force transmitting means.

References Cited in the file of this patent
UNITED STATES PATENTS

| | | |
|---|---|---|
| 293,826 | Way | Feb. 19, 1884 |
| 486,124 | Rager | Nov. 15, 1892 |
| 1,367,426 | Penwell et al. | Feb. 1, 1921 |
| 1,832,639 | Kneeland | Nov. 17, 1931 |
| 2,460,701 | Marshall | Feb. 1, 1949 |
| 3,076,645 | Neuwirth | Feb. 5, 1963 |